May 6, 1941. T. LINDSTROM 2,240,656
CIRCUIT BREAKER
Filed July 31, 1937 6 Sheets-Sheet 4

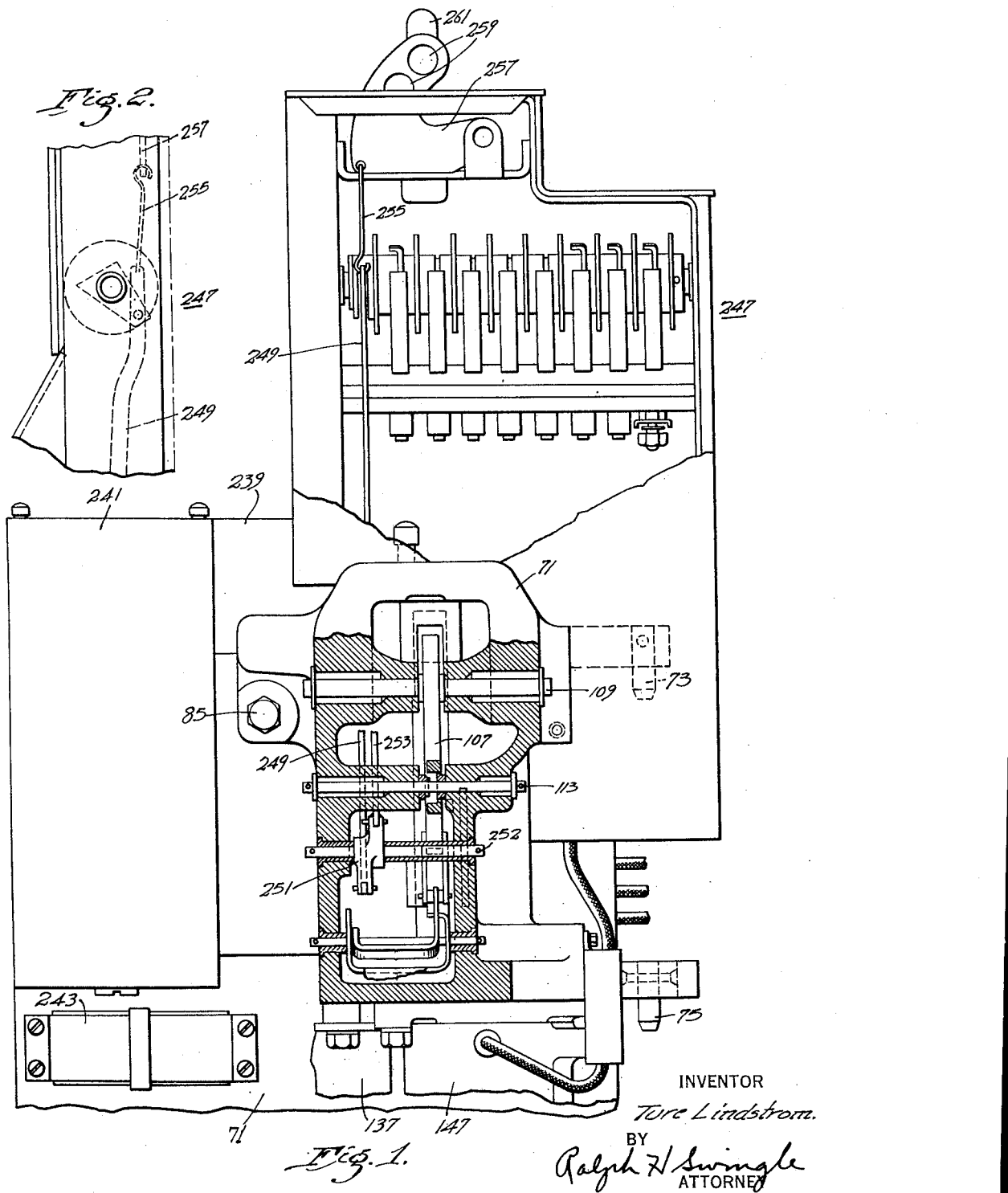

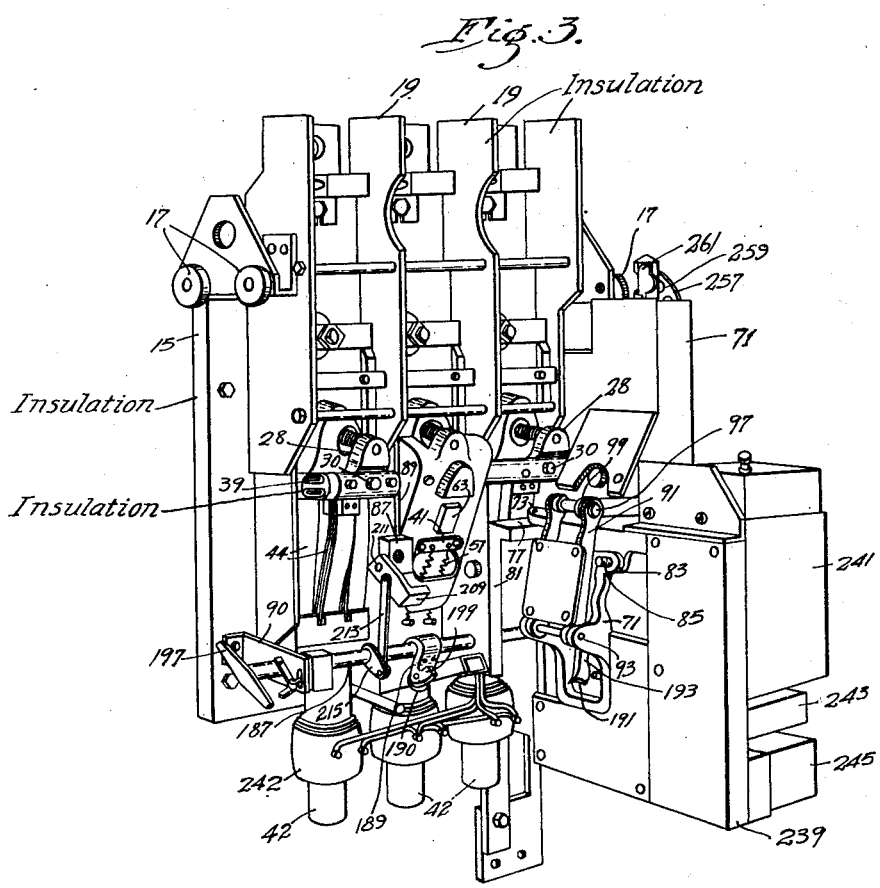
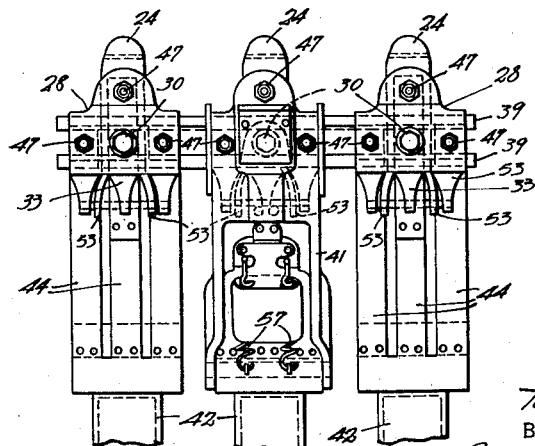

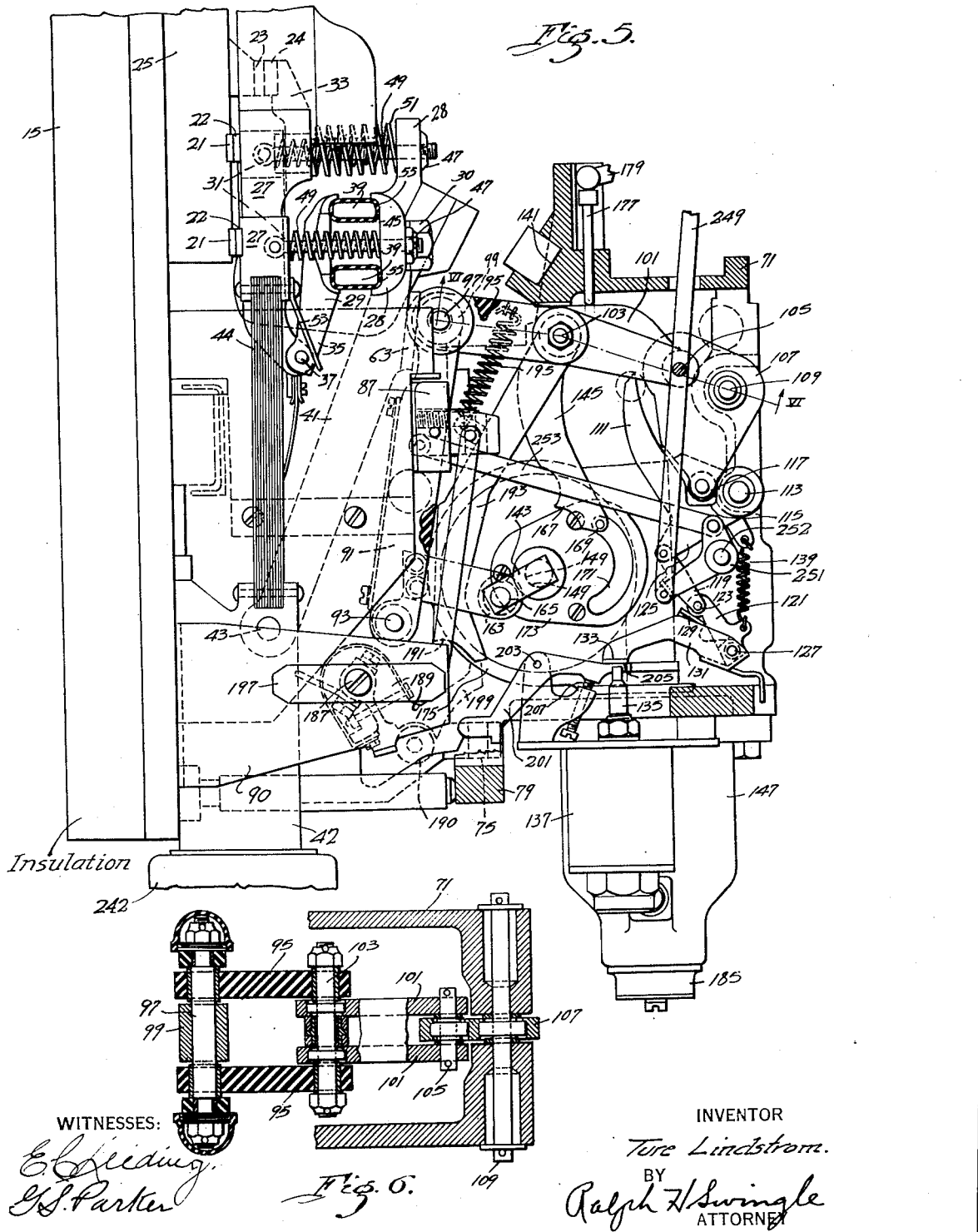

WITNESSES:
INVENTOR
Ture Lindstrom.
BY
Ralph H Swingle
ATTORNEY

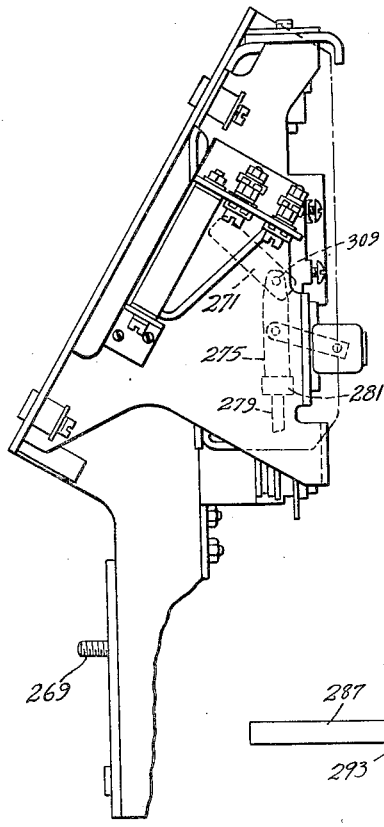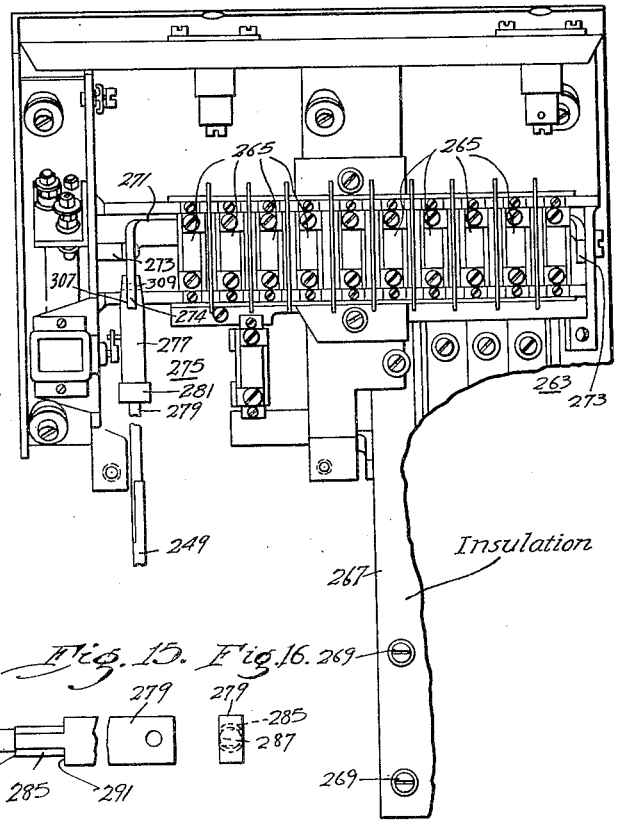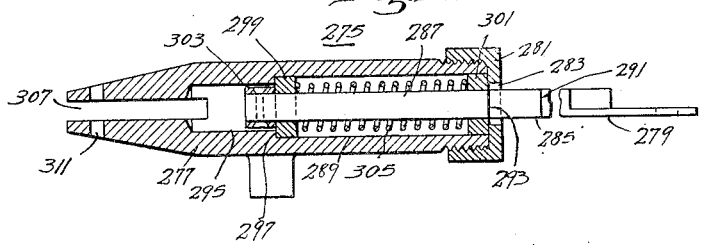

Patented May 6, 1941

2,240,656

UNITED STATES PATENT OFFICE 2,240,656

CIRCUIT BREAKER

Ture Lindstrom, Edgewood, Pa., assignor to Westinghouse Electric & Manufacturing Company, East Pittsburgh, Pa., a corporation of Pennsylvania Application July 31, 1937, Serial No. 156,743

19 Claims. (Cl. 200—92)

The invention relates to circuit controlling devices in general and more particularly to the type of circuit breaker used for controlling and protecting relatively low voltage alternating-current network distribution circuits.

The present invention constitutes a further development of the invention disclosed and claimed in the copending application of John B. MacNeill, Serial No. 126,898, filed Feb. 20, 1937, now Patent No. 2,157,714, issued May 9, 1939, and assigned to the assignee of this invention.

This type of circuit breaker, commonly referred to as an electrical network protector, is usually enclosed in a waterproof housing and located in a manhole or underground vault. Due to the limited amount of space economically available in installations of this kind, the breaker or protector should be extremely compact in design and the contact structure and operating means thereof should be so constructed as to be readily accessible for repair and inspection purposes.

An object of the invention is the provision of a circuit breaker embodying an improved actuating mechanism and closing means therefor.

Another object of the invention is the provision of a circuit breaker embodying an actuating mechanism and closing means which cooperate to provide a large mechanical advantage as the breaker approaches closed position.

Another object of the invention is the provision of a circuit breaker embodying an improved motor-driven closing means which provides a wide range or arc of rotation in which the closing means and motor may be stopped following closing of the breaker.

Another object of the invention is the provision of a circuit breaker embodying an improved actuating and tripping means with a simplified resetting means for resetting the actuating and tripping means following a tripping operation.

Another object of the invention is the provision of a circuit breaker with an improved tripping means embodying an electromagnetic shunt trip unit which can be readily removed and reinstalled without disturbing any conductors of the shunt trip control circuit.

The novel features that are considered characteristic of the invention are set forth in particular in the appended claims. The invention itself, however, both as to structure and operation, together with additional objects and advantages thereof, will best be understood from the following detailed description of several embodiments thereof when read in connection with the accompanying drawings, in which:

Figure 1 is a front view partly in elevation and partly in section of the operating mechanism of the circuit breaker embodying the features of the invention, a portion of the cover for the auxiliary switch panel being broken away;

Fig. 2 is a fragmentary side elevational view of the auxiliary switch means;

Fig. 3 is a perspective view of the circuit breaker illustrating the hingedly mounted operating means in the open or inoperative position;

Fig. 4 is a fragmentary front elevational view of contact means of the circuit breaker;

Fig. 5 is a side elevational view, partly in section, of the contact means and operating means in the closed circuit position of the breaker;

Fig. 6 is a sectional view of the actuating toggle taken on the line VI—VI of Fig. 5;

Fig. 12 is a front elevational view of a modified form of auxiliary switch means for use in connection with the circuit breaker;

Fig. 13 is a side elevational view of the auxiliary switch means shown in Fig. 12;

Fig. 14 is a sectional view of the resilient coupling link which couples the auxiliary switch means shown in Figs. 12 and 13 with the circuit breaker actuating means;

Fig. 15 is a side elevational view of a part of the coupling means; and

Fig. 16 is an end elevational view of the part of the coupling means shown in Fig. 15.

Figures 7, 8, 9:
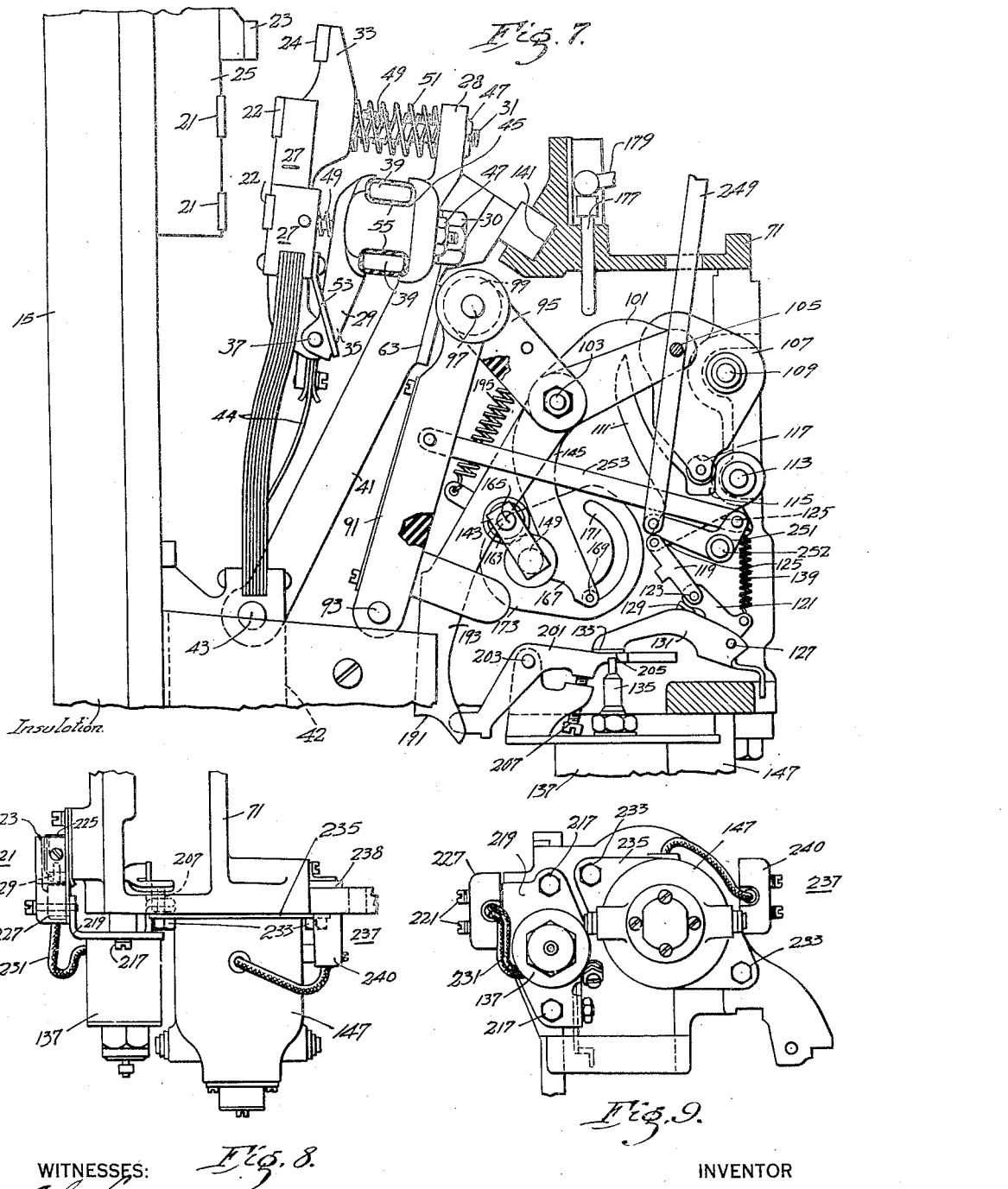
Fig. 7 is a fragmentary side elevational view, partly in section, of the contact means and operating means in the open circuit position of the breaker.
Fig. 8 is a fragmentary front elevational view, partly in section, of the breaker, illustrating the mounting of the shunt trip and motor units on the frame.
Fig. 9 is a fragmentary bottom view illustrating the mounting of the shunt trip and motor units on the frame.

Referring to the drawings and particularly to Figs. 1 through 6 thereof, the circuit breaker illustrated which embodies the features of the invention is mounted on an insulating base 15. The base is provided with horizontally disposed rollers 17 on each side to facilitate positioning and removal of the circuit breaker in its weatherproof housing (not shown), the rollers being adapted to roll on suitable guides disposed in the weatherproof housing.

The circuit breaker illustrated is of the three pole type and has three contact assemblages, one for each pole, mounted on the base 15 and separated by insulating barriers 19. The contact assemblage for each pole of the circuit breaker comprises three triangularly spaced main stationary contacts 21, and a stationary arcing contact 23 disposed vertically above the apex of the triangularly arranged main contacts. The stationary main and arcing contacts 21 and 23 are secured to a current-carrying bus 25 which is in turn secured to the base 15.

The three triangularly spaced movable main contacts 22 for each pole of the breaker which cooperate with the three main stationary contacts 21 are secured to individual contact carrying members 27 which are in turn all supported by a clamp 29. Each contact carrying member is pivotally secured to one end of an eye bolt 31, the opposite end of which extends through an opening provided therefor in the clamp 29. The movable arcing contact 24 which cooperates with the stationary arcing contact 23 is secured to the upper end of a contact carrying member 33 which is pivoted at its lower end to depending projection 35 of the clamp 29 by a pivot pin 37. The movable contacts of each pole are thus supported by their corresponding clamps 29, there being one clamp for each of the three poles of the breaker. The movable contacts and their supporting clamps are all secured for simultaneous movement together by means of two horizontally disposed parallel tie bars 39 which extend across the three poles of the breaker, the clamps 29 for the outer poles being clamped to the tie bars 39 by means of cooperating clamps 28 and bolts 30. The clamp 29 for the center pole is secured to the tie bars 39 and to the upper end of a common contact lever 41 which is in turn pivotally mounted at its lower end to a center pole current carrying bus 42 by a pivot pin 43. The upper end of the lever 41 is provided with a C shaped clamping recess 45 which cooperates with the center clamp 29 to engage the tie bars 39, the center clamp 29 and the upper end of the lever 41 being firmly clamped to the bars 39 by means of a bolt 30. Each contact carrying member 27 is connected with its corresponding current carrying bus 42 by means of a flexible laminated shunt conductor 44. The eyebolts 31 to which the contact carrying members 27 are pivotally connected extend through the clamps 29 and 28 in the case of the outer poles and through the center clamp 29 and the upper end of the common contact lever 41 in the case of the center pole. The upper ends of the eyebolts 31 are provided with adjusting nuts 47 for limiting movement of the contact carrying members 27 away from the clamps 29. The contact carrying members 27 are biased away from their supporting clamps 29 toward the stationary contacts 21 by means of compression springs 49 interposed between the contact carrying members 27 and the clamps 28 in the case of the outer poles, and between the contact carrying members 27 and the C shaped clamping recess 45 in the case of the center pole. The springs 49 encircle their corresponding eyebolts 31. The arcing contact carrying members 33 are likewise biased toward their corresponding stationary arcing contacts 21 by means of compression springs 51 which encircle the upper main contact biasing springs 49.

The counter-clockwise movement of the arcing contact carrying members 33 about their pivot axes 37 under the influence of the springs 51 is limited by lateral projections formed on the members 33 which engage the upper main movable contact carrying members 27 in the open position of the breaker.

In breakers of this type heavy currents are conducted and it sometimes happens that the contacts become welded together. In order to positively break apart the contacts during a switching operation, each of the contact carrying members 27 is provided with a tail piece 53 which is adapted to be engaged by the pivot pin 37 carried by the clamp 29 so that when the breaker is opened considerable leverage is exerted on the tail piece 53 to rock the current carrying members 27 and break apart the welded contacts.

In order to insulate the contact means of each pole of the breaker from each other the tie bars 39 are covered by insulating sheaths 55. The arcing contacts are arranged to engage before the main contacts during a circuit closing operation and to separate last during a circuit opening operation so that all arcing takes place at the arcing contacts. Any suitable type of arc extinguishing means may be provided for quickly extinguishing the arcs formed during circuit interruption.

From the preceding description it will be observed that the movable contacts of all of the poles of the breaker are secured for simultaneous movement together with the common contact lever 41. The contact lever 41 is biased in a clockwise direction about its pivot axis 43 to the open circuit position by means of a pair of accelerating springs 57 (Fig. 3) which are connected at their upper ends to the lever 41 and at their lower end to the center current carrying bus 42.

The contact lever 41 is provided with a bearing plate 63 for engagement by a roller of the actuating mechanism which will be hereinafter described.

The operating mechanism for the breaker is supported by a framework 71 having an upper hinge member 73 (Fig. 3) and a lower hinge member 75 (Fig. 5) adapted to be hinged respectively to corresponding hinge members 77 and 79 carried by a bracket 81 secured to the base 15. The side of the frame 71 opposite the hinge members 73 and 75, is provided with a boss 83 having an aperture therethrough for the reception of a stud bolt 85. The boss 83 is adapted to engage a boss 87 secured to a bracket 89 supported on the insulating base 15. The boss 87 has a threaded aperture for receiving the stud bolt 85, whereby the frame 71 may be secured in operative position with respect to the contact lever 41.

The operating mechanism supported within the framework 71 includes an actuating means consisting of a yoke-shaped switch member 91 (Fig. 3) pivoted at its lower end to suitable projections 93 formed on the frame 71. The upper ends of the two arms of the switch member 91 are pivotally coupled to one end of a pair of toggle links 95 (Figs. 5 and 7) by means of a shaft 97. The shaft 97 carries a roller 99 disposed between the toggle links 95, which roller is adapted to engage the bearing plate 63 secured to the face of the contact lever 41. The other end of the toggle links 95 is pivotally connected to one end of a second pair of toggle links 101 by means of a knee pivot pin 103. The outer end of the pair of toggle links 101 is pivotally connected by pivot pin 105 to a single movable link or support member 107, which is pivoted by means of a pin 109 to the frame 71.

The linkage members 95, 101 and 107 provide a three-link toggle mechanism which when in the made or overset position is retained in that position by a positive latching mechanism comprising a curved latch member 111 pivoted to the frame 71 at 113. The latch member 111 is provided with a U-shaped latch recess 115 (Figs. 5 and 7) for receiving a latch roller 117 carried by the movable support 107. The latch member 111 is adapted to be held in the latched position, as shown in Fig. 5, by means of a latch toggle comprising a pair of toggle links 119 and 121 pivotally joined together by a knee pivot pin 123. The link 119 is pivotally connected to a projection 125 formed on the latch member 111, while the link 121 is pivotally supported on the frame 71 by means of a fixed pivot pin 127.

The knee of the toggle linkage 119, 121 is adapted to rest in its overset or made position against a stop 129 carried by a trip lever 131 which is pivotally mounted on the frame 71 by the pivot pin 127. The trip lever 131 has a bearing surface 133 against which the operating plunger 135 of a shunt trip unit 137 is adapted to strike for the purpose of rocking the trip lever 131 about its pivot 127 to collapse the latch toggle 119, 121.

After each tripping operation, the latch member 111 and the latch toggle 119, 121 are reset automatically by means of a spring 139 connected at one end to a projection carried by the latch member 111 and at its other end to a projection carried by the latch toggle link 121. The spring 139 biases the latch toggle to its overset or made position, as shown in Fig. 5, and also biases the latch member 111 to its latching position when the latch member is in its released position. The line of action of the spring 139 is so disposed relative to the pivot axis 113 of the latch member 111 that it does not bias the latch beyond normal latching position. When the latching member 111 is in the latched position and locked due to the latch toggle being in the overset position, and the actuating linkage 95, 101, 107 is in the overset or made position, the pivot points 103 and 105 are over-center, respectively, with respect to the line joining the pivot points 97 and 105 and the line joining the pivots 103 and 109. Inasmuch as the knee of the toggle formed by the links 95 and 101 have a bearing surface against the frame 71 at 141, and since the support member 107 is held in the latched position by the latching member 111, the force exerted by the contact springs 49, 51 and 57 acting through the contact lever 41, which bears against the roller 99, biases the pivoted support member 107 in a clockwise direction about its pivot pin 109. The tendency for the member 107 to rotate in a clockwise direction is opposed by the roller 117 engaging the left-hand edge of the latch recess 115.

The point of contact of the latch roller 117 at the left-hand edge of the latch recess is such that there is a small moment arm about the pivot axis 113 of the latch member 111 which tends to rotate the latch member 111 in a counter-clockwise direction toward its released position. The latch 111, however, is held in its latched position against this biasing moment arm by reason of the latch toggle 119—121 being in its overset or made position. Thus when it is desired to trip the breaker open, through means energizing the shunt trip unit 137, the operation is as follows: The shunt trip rod 135 is thrust upwardly to engage the bearing surface 133 and rock the trip lever 131 in a clockwise direction about its pivot axis 127. The clockwise movement of the trip lever 131 causes its bearing surface 129 to move the knee 123 of the latch toggle to move the latch toggle to collapsed position. The collapse of the latch toggle allows the latch member 111 to be rotated in a counter-clockwise direction about its pivot axis 113 to released position, thereby releasing the latch roller 117. The release of the latch roller 117 frees the support member 107 and allows the same to rotate in a clockwise direction about its pivot axis 109, so that the pivot pin 105 is carried upwardly and to the right. This movement of the pivot pin 105 causes the line joining the pivot axes 97 and 105 to be moved above the knee pivot pin 103 so as to break the actuating toggle. As soon as the pivoted support 107 begins its clockwise rotation about its pivot axis 109, the yoke-shaped switch member 91 is rocked in a clockwise direction to its open circuit position permitting movement of the contact lever 41 towards the open circuit position to simultaneously effect opening of all of the contact means of the breaker. During the opening of the contact means, it will be understood that the arcing contacts of the several poles are the last to separate. The opening movement of the contact lever 41 is accelerated by the accelerating opening springs 57 and by the almost simultaneous collapse of the actuating toggle linkage 95, 101. As soon as the actuating toggle is released, as described above, and the tripping force is removed from the trip lever 131, the spring 139 restores the latch toggle 119, 121 to made position, while the force of gravity acting on the right-hand end of the actuating toggle and pivoted support 107 returns the pivoted support 107 to its normal or latched position. The latching roller 117 of the pivoted support 107 drops into the U-shaped latch recess 115. The breaker is now completely reset and ready for a closing operation. It will be noted that a single spring means 139 acts to reset the latch toggle, and returns the latch to the position in which it holds the right-hand end of the actuating toggle in operative position. The point of connection of the spring 139 with the latch 111 is so disposed relative to the pivot pin 113 that the moment arm of the spring is a maximum when the latch is in its released position and is substantially zero when the latch is in its latching position.

Figure 10:
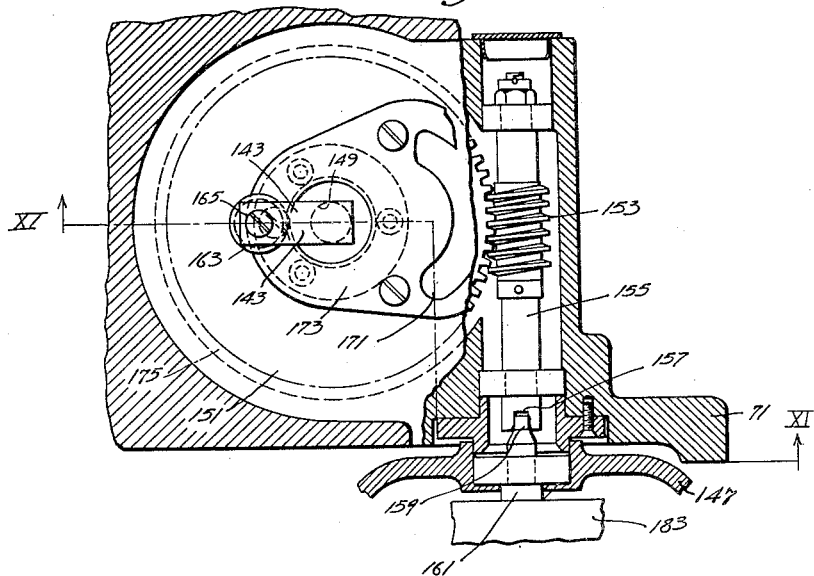
Fig. 10 is a fragmentary view, partly in elevation and partly in section, illustrating the motor-driven closing means, the view being taken substantially on the line 10—10 of Fig. 11.
Figure 11:
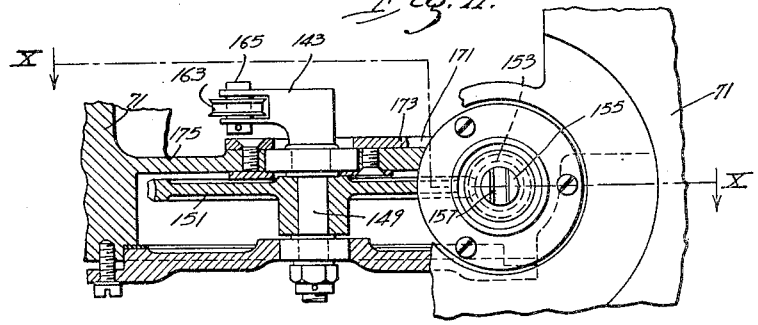
Fig. 11 is a fragmentary view, partly in section, of the motor-driven closing means taken on the line 11—11 of Fig. 10 with the motor removed.

Two means are provided for closing the circuit breaker, a motor closing mechanism and a manually operable mechanism. The motor closing mechansm, which is automatically operable, comprises a rotatable crank arm 143 for engaging a closing lever 145 connected to the actuating toggle 95—101 of the actuating means, and a removable motor unit 147, including a motor for rotating the crank arm 143. The crank arm 143 is secured for rotation to a crank shaft 149 (Figs. 10 and 11) which is rotatably mounted in the frame 71. The crank shaft 149 has a worm gear 151 secured thereto which meshes with and is adapted to be driven by a worm 153 secured to a shaft 155 which is rotatably mounted in the frame 71. One end of the shaft 155 terminates adjacent the edge of the frame 71 and is provided with a notched recess 157 for receiving a tongue 159 formed on the end of the motor shaft 161. The notched recess 157 of the shaft 155 and the tongue 159 formed on the end of the motor shaft 161 form a separable connection between the motor shaft and the worm shaft, which permits the motor unit 147 to be removably mounted, as will be hereinafter described.

The crank arm 143 is provided with a closing roller 163 pivotally mounted on the end of the crank arm by means of a stub shaft 165. The closing roller 163 is adapted to engage an arcuate recess 167 formed on the lower free end of the closing lever 145. The upper end of the closing lever 145 is pivotally connected to the knee pivot pin 103 of the actuating toggle 95, 101. The lower free end of the closing lever 145 is provided with a boss or guide stud 169 adapted for engagement in an arcuate guide slot 171 formed in a guide plate 173 secured to the side of the gear casing 175 which is formed integral with the frame 71.

The operation of the motor closing means is briefly as follows: When the circuit to the motor is energized for a closing operation, the rotation of the motor shaft 161 is transmitted through the worm 153 and worm gear 151 to the crank shaft 149, causing rotation of the crank arm 143. Soon after starting to rotate, the crank arm 143 engages the closing roller 163 in the arcuate recess 167 of the closing lever 145 and moves the closing lever upwardly to drive the actuating toggle comprising the links 95 and 101 to its made or overset position, the right-hand end of the actuating toggle being held in fixed or operative position by reason of the pivoted support 107 which is held in its latched position by the latch member 111. As soon as the actuating toggle 95, 101 has passed over center toward its overset position, the closing roller 163 passes out of engagement with the closing lever 145. It will be noted that the crank arm engages and moves the closing lever 145 to closed circuit position during only a relatively small arc of the travel circle of the crank arm 143. This is a particularly desirable arrangement, since it leaves a wide range or arc of movement in which the crank arm 143 and motor is to be stopped; thus eliminating the necessity of extremely accurate braking means for the motor.

It will be readily understood that movement of the actuating toggle 95, 101 to its overset or made position causes the roller 99 to engage the bearing plate 63 and move the contact lever 41 to its closed circuit position to effect simultaneous closing of the contact means for all of the poles of the breaker.

When the actuating toggle 95, 101 is moved to its overset or made position by the motor closing mechanism, the links 101 engage and move an operating plunger 177, which in turn engages and moves a lever 179 of a cut-off switch connected in a control circuit of the motor 183. Thus when the actuating toggle is moved to the overset or made position, the cut-off switch is thrown to the "off" position, thereby deenergizing the motor circuit.

The motor 183 is provided with a brake mechanism indicated generally at 185 (Fig. 5) which may be of a centrifugal or other suitable type. One suitable form of brake means which may be used is disclosed in detail in the copending application of Ture Lindstrom, Serial No. 59,387, filed Jan. 16, 1936, and assigned to the assignee of this invention, which application became Patent No. 2,192,046 on February 27, 1940. Another suitable form of brake means which might equally well be used is disclosed in detail in the copending application of Floyd D. Johnson, Serial No. 76,165, filed April 24, 1936, and also assigned to the assignee of this invention, which application became Patent No. 2,175,897 on October 10, 1939. The brake mechanism is adapted to stop the crank arm 143 and motor shaft following a closing operation.

The manual means for closing the circuit breaker comprises a shaft 187 (Figs. 3 and 5) rotatably mounted in the bracket 81, and a second bracket 90 secured to the insulating base 15. The shaft 187 has a crank arm 189 secured thereto provided with a roller 190, which is adapted to engage an arcuate recess 191 formed in the free end of a manually operable closing lever 193. The upper end of the manual closing lever 193 is pivotally connected to the knee pivot pin 103 of the actuating toggle 95, 101, and the lever 193 is biased to roller engaging position by a spring 195.

The outer end of the manually operable closing shaft 187 is provided with a male clutch member 197 adapted to be engaged by a suitable female clutch member forming part of an operating handle (not shown) whereby the shaft 187 may be rocked in a counter-clockwise direction to effect a manual closing operation of the circuit breaker. When the shaft 187 is manually rotated in a counter-clockwise direction, the closing roller 190 engages the arcuate recess formed at the lower free end of the manually closing lever 193 and moves the closing lever upwardly to drive the actuating toggle 95, 101 to its overset or made position to effect closing of the circuit breaker in the manner previously described. The crank arm 189 is also provided with a projection 199 which is adapted to be moved into engagement with one end of an auxiliary trip lever 201 (Figs. 5 and 7) when the arm is rotated in a clockwise direction. The auxiliary trip lever 201 is pivoted at 203 on a bracket secured to the trip unit 137. The opposite end of the auxiliary trip lever terminates in a bearing surface 205 which forms a stop for the bearing surface 133 of the trip lever 131. An adjusting screw 207, carried by the bracket which supports the auxiliary trip lever 201, provides an adjustable stop surface for adjusting the position of the auxiliary trip lever 201, the main trip lever 131, and consequently the toggle position of the latch toggle 119, 121. The breaker may be manually tripped open by rotating the shaft 187 in a clockwise direction; that is to say, in the opposite direction in which it is moved for closing the breaker.

In order to prevent the opening of the hinged frame 71 or, in other words, to keep from swinging the operating mechanism to the inoperative position at times when the breaker contacts are in the closed position, an interlock between the trip mechanism and the securing means for holding the frame 71 in the fixed position is provided. This interlock consists of a covering member 209 (Fig. 3) pivoted at 211 to the bracket 89. The covering member 209 has a transverse portion which normally extends in covered relation over the head of the fastening bolt 85 which retains the frame 71 in closed operative position. The covering member is connected by a link 213 to a crank 215 secured to the manual operating shaft 187. The crank 215 is so positioned with respect to the crank 189 that the covering member 209 permits access to the bolt 85 only when the projection 199 of the crank 189 has moved the auxiliary trip lever 201 to trip the breaker. Thus in order to swing the frame 71 away from the base 15, it becomes necessary to first operate the manual control shaft 187 to the tripped position to trip the contacts open.

After the breaker has been tripped by rotating the shaft 187 in a clockwise direction, the bolt 85 may be removed and the frame 71, which carries the operating mechanism, may be swung to the open position as shown in Fig. 3, thus permitting ready access to the contact mechanism for inspection or repair.

In order to facilitate inspection, replacement or repair of the shunt trip unit without disassembling the breaker, the shunt trip unit 137 is removably mounted on the frame 71. Referring to Figs. 8 and 9, the shunt trip unit 137 is mounted by means of a pair of mounting bolts 217, which extend through openings provided therefor in a mounting plate 219 carried by the trip unit. The bolts 217 are adapted to engage threaded openings provided therefor in the frame 71 of the operating mechanism. In order to automatically connect the shunt trip coil carried by the shunt trip unit 137 in its control circuit when the unit is mounted on the frame 71, there is provided a separable electrical connecting means 221. The separable connecting means consist of a female contact socket 223 secured to the frame 71 having a pair of spaced contacts 225, and a cooperating contact plug 227 secured to the mounting plate 219 of the shunt trip unit, which has a pair of male contact members 229 adapted to engage the female contact members 225 carried by the socket 223. A pair of conductor wires 231 connect the male contact members 229 to the ends of the shunt trip coil carried by the shunt trip unit 137. It will thus be seen that the shunt trip unit 137 can be readily removed and reinstalled without disturbing any conductor wires, and that it is automatically connected in its control circuit when mounted on the frame 71. When the shunt trip unit is removed the latch toggle collapses and trips the breaker open due to the fact that the stop for the latch toggle and trip lever 131 is removed with the trip unit.

The motor unit 147 is also removably mounted on the frame 71 by means of a pair of mounting bolts 233 (Figs. 8 and 9) which pass through openings provided therefor in a mounting plate 235 carried by the motor unit. The mounting bolts 233 are adapted to engage suitable threaded openings provided therefor in the frame 71. When the motor unit 147 is mounted in position on the frame 71, the tongue 159 on the projecting end of the motor shaft 161 engages the notch 157 provided at the end of the worm shaft 155, so that the motor shaft 161 and the worm shaft are disposed in driving engagement. A separable electrical connecting means 237 (Figs. 8 and 9) is provided for automatically connecting the motor in its control circuit when the motor is mounted on the frame 71. This separable connecting means is substantially similar to the separable electrical connecting means for the shunt trip unit and comprises a pair of spaced contact members carried by a female terminal socket 238 secured to the frame 71 and a pair of cooperating spaced male contact members carried by a plug connector 240 secured to the mounting plate 235 of the motor unit 147. Thus the motor is adapted to be automatically connected in its control circuit when the motor unit is mounted in operative position on the supporting frame 71, and the motor unit may be readily removed without disturbing any conductor wires.

Referring to Figs. 1 and 3, the frame 71 is provided with a panel 239 which is adapted to be rigidly secured to the frame and to be movable therewith. Suitable relays indicated generally at 241, 243 and 245 may be mounted on the panel 239 for controlling the various switching operations. The relays are adapted to receive energy from suitable current transformers 242 which encircle the busses 42.

The panel 239 is also utilized for mounting auxiliary control switches indicated generally at 247 (Fig. 1). The switches 247 in this instance are actuated by an operating rod 249 connected to a bell-crank lever 251 (Fig. 7) pivoted at 252 on the frame 71. One arm of the bell-crank lever 251 is connected by an actuating link 253 to the switching member 91, the other arm of the bell-crank lever being pivotally connected to the operating rod, 249. It will be apparent that when the switch member 91 is moved to the open circuit position, the connecting link 253 will rock the bell-crank lever in a clockwise direction about its pivot 252, causing the operating rod 249 to actuate the auxiliary switch means 247. The operating rod 249 is also coupled by a suitable link 255 to a signal semaphore 257 pivoted to the base of the auxiliary switch means. The semaphore 257 is provided with colored signal lenses 259 adapted to be moved respectively in front of an indicating lamp 261. Thus the lamp in projecting light through the colored signal lenses 259 will indicate the open and closed positions of the breaker in accordance with a predetermined color code.

Referring to Figs. 12, 13 and 14, a modified form of auxiliary switch means is shown for use in connection with the circuit breaker. In this embodiment, the auxiliary switch means indicated generally at 263 comprises a plurality of snap-acting toggle switches 265 of any suitable type embodying an overcenter spring actuating mechanism and an operating lever movable through a dead-center position to open and closed circuit positions. The auxiliary switches 265 are mounted on an insulating base 267 which is adapted to be secured to the frame 71 by means of mounting screws 269. The operating levers of the auxiliary switches are secured for movement together by means of a U-shaped operating member 271, which is pivoted on the base 267 by means of a pair of pivot studs 273. The U-shaped operating member 271 is coupled to the operating rod 249 by a resilient coupling means indicated generally at 275 and is adapted to be rocked about its pivot axis by movement of the operating rod 249 which is actuated in conjunction with the opening and closing movement of the breaker, the rocking movement of the U-shaped operating member to one extreme position or the other effecting simultaneous operation of the auxiliary switches to their open or closed circuit positions.

The resilient coupling means 275 comprises a tubular member 277 and a member 279 which are disposed for limited axial telescopic movement relative to one another. The tubular member 277 is provided with an end closure cap 281 adapted to be threaded on the end of the tubular member 277, and the cap is provided with an opening 283 for receiving a reduced portion 285 of the member 279. The member 279 is provided with a further reduced portion 287 which is cylindrical in cross-section. The cylindrical portion 287 extends within the bore 289 drilled in the tubular member 277. The reduced portion 285 of the member 279 forms a shoulder 291, which is adapted to engage the end of the cap 281 to limit inward movement of the member 279 relative to the tubular member 277, while the junction of the further reduced portion 287 and the reduced portion 285 provides a shoulder 293 forming a bearing surface on the member 279. The tubular member 277 is provided with a second reduced bore 295 which joins the bore 289. The junction of the bores 289 and 295 forms an annular shoulder 297 providing a bearing surface for the member 277. A pair of annular bushing members 299 and 301 are slidably mounted on the cylindrical reduced portion 287 of the member 279. The slidably mounted bushings 299 and 301 act to center the cylindrical portion 287 of the member 279 and guide the same in its telescopic movement within the bore 289. A collar 303 is secured to the end of the cylindrical portion 287 of the member 279 by means of a rivet. A compression spring 305 is disposed in stressed condition between the slidable bushings 299 and 301. The stressed compression spring 305 biases the bushing 299 against the shoulder or bearing surface 297 of the tubular member 277, and the bushing 301 against the cap 281, and shoulder or bearing surface 293 of the member 279.

When the member 277 is connected to a load which resists movement of said member, and the member 279 is moved to the left, the movement is transmitted through the bearing surface or shoulder 293 to the slidable bushing 301 and the compression spring 305 to the bushing 299, which is seated against the bearing portion or shoulder 297 of the tubular member 277. If the load applied to the tubular member 277 is greater than the reactive force of the stressed compression spring 305, the spring will be further compressed as the member 279 moves axially to the left relative to the member 277. When the spring 305 has been compressed to such an extent that its reactive force equals the load applied to the tubular member 277, further movement of the member 279 will be transmitted through the spring 305, bushing 299, and shoulder or bearing portion 297 to effect movement of the member 277 to the left. In other words, the spring 305 is compressed until its reactive force equals the load on the tubular member 277, and further movement of the member 279 is then transmitted through the spring to the tubular member 277 by the engagement of the bushing 299 with the bearing surface 297. Similarly, when a load is connected to the tubular member 277 which resists movement of the same to the right. and the member 279 is moved toward the right, the member 279 is moved axially to the right relative to the member 277. This relative axial movement of the member 279 acts to further compress the spring 305 by reason of the fact that the collar 303, which moves with the member 279, carries the bushing 299 in a right-hand direction to further compress the spring 305. When the spring 305 has been compressed to the point at which its reactive force equals the resisting force of the load applied to the tubular member 277, the further movement of the member 279 is transmitted through the spring 305, bushing 301 and cap 281 to the tubular member 277, so that the member 277 is moved along with the member 279. It will thus be seen that the spring 305 is always worked in compression regardless of the direction in which the member 279 is moved.

The tubular member 277 is provided with a recess 307 for receiving an extension 274 of the U-shaped auxiliary switch operating member 271. The extending end portion 274 is pivotally connected to the tubular member 277 by means of a pivot pin 309 which passes through a transverse circular opening 311 formed in the recessed end of the tubular member 277 and an opening provided in the extending end portion 274 of the switch operating member 271. The end of the member 279 of the resilient coupling means 275 is connected to the operating rod 249 of the circuit breaker.

Referring to Fig. 12, the operation of the auxiliary switch means in conjunction with the circuit breaker is briefly as follows: In Fig. 12, the auxiliary switch operating member 271 is shown in one of its operative positions, the operating rod 249 and the breaker being in the closed circuit position. When the circuit breaker is tripped open, either manually or by the electromagnetic shunt trip 147 as previously described, the crank arm 251 (Fig. 5) is moved in a clockwise direction about its pivot axis 252 to cause upward movement of the operating rod 249. The load of the auxiliary switch means 263, which is connected by means of the switch operating member 271 to the tubular member 277 of the flexible coupling means 275, is of such magnitude as to prevent movement of the tubular member 277 during the initial opening movement of the breaker. During this initial opening movement, the upward movement of the rod 249 further compresses the spring 305, the tubular member 277 remaining stationary. When the spring 305 has been compressed by the upward movement of the operating rod 249 to the point at which its reactive force equals the load imposed on the tubular member 277 by the auxiliary switch means, or until the members 277 and 279 reach their inward limit of movement, further upward movement of the operating rod 249 is transmitted through the spring 305 to the tubular member 277, causing upward movement of that member and counter-clockwise rocking movement of the auxiliary switch operating member 271. When the operating levers of the auxiliary switches 265 approach their dead-center position when moved by the rocking movement of the auxiliary switch operating member 271, the force required to operate the auxiliary switches decreases, thus decreasing the load imposed on the tubular member 277 of the coupling means. The load imposed on the tubular member 277 as the auxiliary switch levers approach dead-center position is considerably less than the reactive force of the compression spring 305, so that the compression spring 305 at this point expands and moves the tubular member 277 relative to the member 279 and operating rod 249, to cause the switch operating lever 271 to throw the operating levers of the auxiliary switches 265 through their dead-center position to operate the auxiliary switches. The resilient coupling means thus acts somewhat in the manner of an accelerating spring in operating the auxiliary switches. The auxiliary switches are arranged to be operated the moment the arcing contacts 23, 24 of the breaker engage or separate during operation of the breaker.

When the circuit breaker is closed, either manually or automatically, the bell-crank lever 251 is rotated in a counter-clockwise direction about its pivot pin 252 to cause downward movement of the operating rod 249. During the initial portion of the downward movement of the operating rod 249, the compression spring 305 of the coupling means 275 is further compressed, the tubular member 277 thereof remaining stationary because of the load imposed thereon by the auxiliary switches. When the reactive force of the spring 305 equals the load imposed on the member 277 by the auxiliary switch means, further downward movement of the operating rod 249 is transmitted through the spring 305 and the tubular member 277 to effect downward movement of said member. Downward movement of the member 277 rocks the auxiliary switch operating member 271 in a clockwise direction about its pivot axis 273 to simultaneously move the operating levers of the auxiliary switches 265. When the operating levers of the auxiliary switches approach dead-center position, the force required to operate them decreases and the compression spring 305 expands, due to the fact that its reactive force is greater than the load imposed on the tubular member 277, and moves the member 277 downwardly relative to the member 279 to throw the auxiliary switch operating levers through their dead-center position to operate the auxiliary switches. The auxiliary switches 265 are arranged to be operated the moment the arcing contacts 23 and 24 of the breaker engage during a breaker closing operation.

One of the auxiliary switches 265 is connected in the control circuit of the electromagnetic shunt trip 137 and arranged to close the moment the arcing contacts of the breaker engage during a circuit closing operation, so that the shunt trip 137 is always ready to operate the moment the arcing contacts engage.

The resilient coupling means 275 also functions to permit over-travel of the operating rod 249 relative to the auxiliary switch operating member 271, so that the operating rod 249 can continue to move after the auxiliary switches have reached either of their operative limiting positions.

While the invention has been disclosed in accordance with the patent statutes, it is to be understood that various changes in the structural details thereof may be made without departing from the spirit of the invention. It is desired, therefore, that the appended claims be given the broadest reasonable construction permissible in the light of the prior art.

I claim as my invention:

1. In a circuit breaker, a switch member movable to open and to closed circuit position, operating means comprising a toggle engageable at one end with said switch member, releasable means normally restraining the other end of said toggle in an operative position, a closing lever for moving the knee of said toggle to close said switch member, said lever being provided with a roller engaging surface, a rotatable crank arm provided with a roller adjacent its free end, said crank arm being operable to cause said roller to engage said surface and move said closing lever during a relatively small portion of its travel circle to effect closing of said switch member and to then cause said roller to pass out of engagement with said closing lever, motor means for operating said crank to close said switch member, and means for automatically stopping said crank following its disengagement from said closing lever.

2. In a circuit breaker, a switch member movable to open and to closed circuit position, operating means comprising a toggle engageable at one end with said switch member, releasable means for normally restraining the other end of said toggle in an operative position, a closing lever engageable at one end with the knee of the toggle movable to cause said toggle to close said switch member, a rotatable crank arm operable to engage and move said closing lever during a relatively small arc of its travel circle to close said switch member, and to then disengage said closing lever, a motor for operating said crank arm, a circuit for said motor, means for automatically deenergizing said motor when said closing lever completes its closing movement, and means for causing said crank arm to be brought to rest after it has rotated through an angle following its disengagement from said closing lever.

3. In a circuit breaker, contact means for opening and closing the circuit, actuating means for said contact means, operating mechanism for closing said contact means comprising a translatable closing lever connected at one end to said actuating means and provided with a roller receiving recess adjacent its free end, a rotatable crank arm provided with a roller adjacent its free end, an arcuate guide for the free end of said closing lever, said crank arm being operable to engage said roller in said recess and translate said closing lever during an arc of its travel circle to effect closing of said switch member and to then disengage said roller from said recess, said guide maintaining the closing lever in engagement with said roller during said arc of the travel circle of said crank arm, and means operable to cause opening of said contacts irrespective of the position of said crank arm.

4. In a circuit breaker, a switch member movable to open and to closed circuit position, actuating means for the switch member including an actuating toggle, means releasably restraining said toggle in operative position, operating means for closing said switch member comprising a translatable closing lever connected at one end to the knee of said actuating toggle and provided with a roller receiving recess adjacent its free end, an arcuate guide for the free end of said closing lever, a rotatable crank arm provided with a roller for engaging said recess, said crank arm being operable to engage said roller in said recess and translate said closing lever from an open position to a closed position during a relatively small arc of the travel circle of the crank to cause said actuating toggle to close said switch member, and to then disengage said roller from said recess, trip means for releasing said restraining means to cause said actuating mechanism to open said switch member irrespective of the position of said crank arm, and means for automatically collapsing said toggle to return said closing lever to open position and means for automatically resetting said toggle restraining means following each opening of said switch member.

5. A latching and tripping mechanism for a circuit breaker having a member releasable to cause opening of the breaker, said mechanism comprising a pivoted latch for normally restraining said releasable member, a latch toggle having an overset position for maintaining said latch in latching position, trip means for collapsing said latch toggle to release said latch and thereby release said releasable member, and spring means interconnecting said latch and latch toggle for resetting said latch and latch toggle following a tripping operation, the point of connection of said spring with said latch and said toggle being so disposed relative to the pivot axis of the latch and relative to the pivot of one of the links of the toggle that the moment arm of the spring is substantially a maximum when the latch is in the released position and is very small when the latch is in its latched position.

6. In a circuit breaker, a switch member movable to open and to close the circuit, actuating means for said switch member including a main toggle engaging said switch member at one end, a pivoted support for the opposite end of said toggle, a releasable pivoted latch for maintaining said pivoted support in a normal position to provide a fixed pivot for said opposite end of the toggle, a latch toggle which in its overset position maintains said latch in latching position to maintain said support in its normal position, trip means for collapsing said latch toggle to release said latch and said support to cause opening of the circuit, and a single spring means connected to the latch and the latch toggle for resetting said latch and said latch toggle following a tripping operation, said spring means being so disposed that its moment arm with respect to the pivot axis of the latch and also with respect to the fixed pivot of the latch toggle is very small when the latch is in its latched position and is substantially a maximum when the latch is in released position.

7. In a circuit breaker, contact means, actuating means for said contact means, a support for said actuating means, a trip means operable to cause said actuating means to open said contact means comprising an electromagnetic trip unit, a control circuit for said trip unit, means for removably mounting said trip unit on said support, and separable electrical connecting means carried in part by said support and in part by said trip unit for automatically connecting said trip unit in its control circuit when said unit is mounted on said support, said separable electrical connecting means being separate and independent of said means for removably mounting said trip device on said support.

8. In a circuit breaker, a switch member movable to open and to closed circuit position, operating means comprising a translatable closing lever movable substantially in the direction of its length to close said switch member, a rotatable crank arm operable during a relatively small part of its travel circle to engage one end of said closing lever and move said end through a substantially arcuate path about the axis of rotation of the crank arm to move said closing lever substantially in the direction of its length thereby causing closing of said switch member and to then disengage said closing lever, an electric motor for rotating said crank arm, an energizing circuit for said motor, means operable to open said motor circuit when said closing lever has closed said switch member, and means for causing said crank to be brought to rest after it has rotated through an angle following disengagement thereof from said closing lever.

9. In a circuit breaker, a switch member movable to open and to closed circuit position, operating means for closing the switch member comprising a translatable closing lever movable substantially in the direction of its length to close said switch member, a rotatable crank arm operable during only a portion of its travel circle to engage one end of said closing lever and move said end in a substantially arcuate path about the axis of rotation of the crank arm to effect closing of said switch member and to then disengage said closing lever, manually operable means for operating said crank arm, and means operable to cause movement of said switch member to open circuit position irrespective of the position of crank arm.

10. In a circuit breaker, a switch member movable to open and to closed circuit position, operating means for moving said switch member to closed position comprising a translatable closing lever movable substantially in the direction of its length to close said switch member, said lever being provided with a roller receiving recess adjacent one end, a rotatable crank arm having a roller adjacent its free end for engaging in said recess, said crank arm being operable during only a portion of its travel circle to engage said roller in said recess and move the end of the lever having the recess in a substantially arctuate path about the axis of rotation of the crank arm to effect closing of said switch member and to then disengage the roller from said recess, and means operable to cause movement of said switch member to open circuit position irrespective of the position of said crank arm.

11. In a circuit breaker, a switch member movable to open and to closed circuit position, operating means comprising a toggle engageable at one end with said switch member, releasable means normally restraining the other end of said toggle in an operative position, a closing lever engageable at one end with the knee of said toggle, said lever being movable to cause said toggle to close said switch member, a rotatable crank arm operable to engage and move said closing lever during only a portion of its travel circle to close said switch member and to then disengage said closing lever, said crank arm making an angle of not substantially greater than 90° with the direction of movement of the point of the lever which it engages at the start of the closing movement of the lever and making an angle substantially greater than 90° with the direction of movement of the point of the lever which it last engages prior to disengaging said lever.

12. In a circuit breaker, a switch member movable to open and closed circuit position, a toggle for actuating said switch member, releasable means normally restraining one end of said toggle in operative position, a translatable closing lever connected at one end to said toggle and having a roller receiving recess adjacent its other end, said closing lever being movable substantially in the direction of its length to cause said toggle to close said switch member, a rotatable crank arm having a roller adjacent its free end, said crank arm being operable during only a portion of its travel circle to engage said roller in said recess and move the end of the lever having the recess in a substantially arcuate path about the axis of rotation of the crank arm to effect closing of said switch member and to then disengage said roller from said recess.

13. In a circuit breaker, a switch member movable to open and to closed circuit position, operating means comprising a toggle operable to move said switch member to closed circuit position, releasable means normally restraining one end of said toggle in an operative position, a closing lever engageable with the knee of said toggle for moving said toggle to cause closing of said switch member, and a rotatable crank arm operable during a portion of its travel circle to engage and move said closing lever to cause closing of said switch member and to then disengage said lever, said crank arm making an angle of less than 90° with the direction of movement of the point of the closing lever which it engages at the start of the closing movement of the lever and making an angle substantially greater than 90° with the direction of movement of the point of the closing lever which it last engages prior to disengaging said lever.

14. In a circuit breaker, a switch member movable to open and to closed circuit position, operating means comprising a toggle movable to close said switch member, releasable means normally restraining one end of said toggle in an operative position, a closing lever engageable at one end with the knee of said toggle and movable to cause said toggle to close said switch member, a rotatable crank arm operable during only a portion of its travel circle to engage and move said closing lever to effect closing of said switch member and to then disengage said lever, and a motor for operating said crank arm, said crank arm making an angle not substantially greater than 90° with the direction of movement of the point of the closing lever which it engages at the start of the closing movement of the lever and making an angle substantially greater than 90° with the direction of movement of the point of the closing lever which it last engages prior to disengaging said lever.

15. In a circuit breaker, a switch member movable to open and to closed circuit position, operating means comprising a toggle movable to close said switch member, releasable means normally restraining one end of said toggle in an operative position, a closing lever engageable at one end with the knee of said toggle and movable to cause said toggle to close said switch member, a rotatable crank arm operable during only a portion of its travel circle to engage and move said closing lever to effect closing of said switch member and to then disengage the lever, a motor for rotating said crank arm, an energizing circuit for said motor, and means operable to open said motor energizing circuit at the completion of the closing movement of the switch member, said crank arm making an angle not substantially greater than 90° with the direction of movement of the point of the closing lever which it engages at the start of the closing movement of the lever and making an angle substantially greater than 90° with the direction of movement of the point of the closing lever which it last engages prior to disengaging said lever.

16. In a circuit breaker, a switch member movable to open and closed circuit position, operating means comprising a toggle engageable at one end with said switch member, releasable means normally restraining the other end of said toggle in an operative position, a translatable closing lever connected to the knee of said toggle and movable to cause said toggle to close said switch member, a rotatable crank arm operable during a part only of its travel circle to engage said lever adjacent one end and move said end in a substantially arcuate path about the axis of rotation of the crank arm to effect closing of the switch member and to then disengage said closing lever, a motor for operating said crank arm, an energizing circuit for said motor, and means operable to open said motor energizing circuit when said switch member has completed its closing movement.

17. In a circuit breaker, a switch member movable to open and to closed circuit position, operating means comprising a toggle movable to close said switch member, releasable means normally restraining one end of said toggle in an operative position, a closing lever engageable at one end with the knee of said toggle and movable to cause said toggle to close said switch member, a rotatable crank arm operable during only a portion of its travel circle to engage and move said closing lever to effect closing of said switch member and to then disengage said lever, a motor for operating said crank arm, said motor being capable of continuing its rotation after said switch member reaches closed position without affecting the position of the toggle or closing lever, said crank arm making an angle not substantially greater than 90° with the direction of movement of the point of the closing lever which it engages at the start of the closing movement of the lever and making an angle substantially greater than 90° with the direction of movement of the point of the closing lever which it last engages prior to disengaging said lever.

18. In a circuit breaker, a switch member movable to open and to closed circuit position, operating means comprising a toggle engageable at one end with said switch member, releasable means normally restraining the other end of the toggle in an operative position, a closing lever engageable at one end with the knee of the toggle movable to cause said toggle to close said switch member, a rotatable crank arm operable to engage one end of said closing lever and move said closing lever during a relatively small arc, less than 135 degrees, of the travel circle of said crank arm to effect closing of said switch member and to then disengage said closing lever, a motor for operating said crank arm, a circuit for energizing said motor, and means for automatically opening said motor circuit when said closing lever has closed said switch member, said crank arm making an angle of less than 90° with the direction of movement of the point of the closing lever which it engages at the start of the closing movement of the lever and making an angle substantially greater than 90° with the direction of movement of the point of the closing lever which it last engages prior to disengaging said lever.

19. In a circuit breaker, a switch member movable to open and to closed circuit position, operating means comprising a toggle engageable at one end with said switch member, releasable means normally restraining the other end of the toggle in an operative position, a closing lever engageable at one end with the knee of the toggle movable to cause said toggle to close said switch member, a rotatable crank arm operable during a relatively small arc, less than 135°, of the travel circle thereof to engage and move the other end of the closing lever in a substantially arcuate path about the axis of rotation of the crank arm to effect closing of the switch member and to then disengage said closing lever, and manually operable means for rotating said crank arm.

TURE LINDSTROM.